(12) United States Patent
Harrah et al.

(10) Patent No.: US 6,886,100 B2
(45) Date of Patent: Apr. 26, 2005

(54) DISABLING TOOL EXECUTION VIA ROLES

(75) Inventors: Richard D. Harrah, Seattle, WA (US); Humberto A Sanchez, II, Ft Collins, CO (US); Jeffrey R. Finz, Portland, OR (US); Mary Thomas Robb, Fort Collins, CO (US); Terence E. Lister, Fort Collins, CO (US); Paula B. Curtis, Windsor, CO (US); Douglas P. Drees, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 884 days.

(21) Appl. No.: 09/855,937

(22) Filed: May 15, 2001

(65) Prior Publication Data

US 2002/0174333 A1 Nov. 21, 2002

(51) Int. Cl.[7] ................................................. H04L 9/00
(52) U.S. Cl. ....................................... 713/200; 713/201
(58) Field of Search ................................... 713/200, 201

(56) References Cited

U.S. PATENT DOCUMENTS 5,692,129 A * 11/1997 Sonderegger et al. ... 707/103 R

* cited by examiner

Primary Examiner—Thomas R. Peeso

(57) ABSTRACT

A method and apparatus for managing tool execution via roles on a computer system while maintaining computer system security, wherein the computer system comprises a plurality of roles, are disclosed. Such a method and apparatus may include delegating tools to a user based on a role, wherein a tool provides root access for performing a specific task in the computer system and the role is an authorized role that enables the user to run the delegated tools, identifying one of the plurality of roles to be disabled, wherein the identified role is the authorized role, accessing the identified role, and, disabling the identified role so that the user cannot run the delegated tool(s). Disabled roles may likewise be enabled according to a disclosed method and apparatus. Embodiments of the invention may comprise authorization objects that comprise attributes identifying the roles and machine for which a user is authorized.

20 Claims, 7 Drawing Sheets

DISABLING TOOL EXECUTION VIA ROLES

TECHNICAL FIELD

The technical field generally relates to network system security, and particularly relates to administrators' delegation of high-level permissions to multiple users.

BACKGROUND

In many computer systems, there is often a restricted class of users (e.g., root users) that have read and write access (e.g., root access) to the computer systems. These users are often the overall administrators of the computer systems. As such, these users often have a large number of responsibilities that prevent them from being able to efficiently perform everyday tasks (e.g., managing databases, websites, adding new users, etc.) on the machines of the computer systems. Somehow, these users must delegate their system access to other users.

Unfortunately, in these computer systems, access is limited to either all or nothing. In other words, a root user may delegate complete and total access to a non-root user or none at all. As a result, even if a root user wants to enable a non-root user only to be able to add users or administer a database on a single machine in the computer system, the non-root user will have total access to the computer system and be able to do most anything on the computer system. Clearly, this presents a significant problem with regard to computer system security.

One possible solution has been to limit the delegation of total access to non-root users to a discrete period of time. This solution enables the non-root user to perform an assigned task during the discrete period of time. Unfortunately, this solution is not satisfactory since the non-root user will still have complete computer system access, jeopardizing computer system security, for the discrete period of time.

Moreover, administrators of computer systems were required to give root access to trouble-shooters (e.g., customer engineers) and other transient users who only occasionally require access. The administrators had to set up accounts before the trouble-shooter could access machines of the computer systems. Once the trouble-shooter was done, the administrator had to remove access by tearing down the account. Setting up accounts and tearing down the accounts could be particularly complex and time-consuming. Additionally, the trouble-shooter had complete root access while the account persists, thereby jeopardizing security.

The Hewlett Packard Company does provide a product called Systems Administration Management ("SAM") that provides a "restricted" SAM access functionality (see U.S. Pat. Ser. No. 5,579,478). Likewise, there is a public domain UNIX tool called "sudo" which provides an ability to run commands as root on a per command basis. However, unlike the present invention, these tools are focused on a single system, at least do not allow access control across multiple systems (e.g., node), and do not allow the degree of control that the present invention does, among other disadvantages.

Accordingly, a system and method for easily enabling and disabling transient accounts is needed. A system and method that is not complex and that is not time consuming is needed. Moreover, a system and method that does not give the transient account user complete root access and that preferably limits the transient account user to root access for certain delineated tasks is needed. A system and method that supports disabling tool execution via roles is needed.

SUMMARY

A method and apparatus delegate root access to non-root users of a computer system while maintaining computer system security. An embodiment comprises a system and method for allocating tools, which may be executed by non-root users to perform previously root-only tasks, based on roles that users are authorized to utilize. Root users or other users that have been authorized to create roles and tools preferably create the roles and tools.

An embodiment enables the creation of transient roles comprising the appropriate tools for the transient user. An embodiment enables an administrator to easily and quickly enable and disable tool execution by the transient users. These and other advantages may be achieved by a method of managing tool execution via roles on a computer system while maintaining computer system security, wherein the computer system comprises a plurality of roles, comprising delegating one or more tools to a user based on a role, wherein a tool provides root access for performing a specific task in the computer system and the role is an authorized role that enables the user to run the delegated tool(s), identifying one of the plurality of roles to be disabled, wherein the role identified to be disabled is the authorized role, accessing the role identified to be disabled so that the status of the role identified to be disabled may be changed, and, disabling the role identified to be disabled, whereby the status of the role identified to be disabled is changed, so that the user cannot run the delegated tool(s).

Likewise, these and other advantages may be achieved by a computer readable medium comprising instructions for managing tool execution via roles on a computer system while maintaining computer system security, wherein the computer system comprises a plurality of roles, by delegating one or more tools to a user based on a role, wherein a tool provides root access for performing a specific task in the computer system and the role is an authorized role that enables the user to run the delegated tool(s), identifying one of the plurality of roles to be disabled, wherein the role identified to be disabled is the authorized role, accessing the role identified to be disabled so that the status of the role identified to be disabled may be changed, and, disabling the role identified to be disabled, whereby the status of the role identified to be disabled is changed, so that the user cannot run the delegated tool(s).

Further, these and other advantages may be achieved by a method of managing tool execution via roles on a computer system while maintaining computer system security, wherein the computer system comprises a plurality of roles, comprising identifying one of the plurality of roles to be enabled, wherein the role identified to be enabled is an authorized role of a user, wherein the authorized role enables the user to run one or more delegated tools, wherein a tool provides root access for performing a specific task in the computer system, accessing the role identified to be enabled so that the status of the role identified to be enabled may be changed, and, enabling the role identified to be enabled, whereby the status of the role identified to be enabled is changed, so that the user can run the delegated tool(s).

BRIEF DESCRIPTION OF THE FIGURES

The detailed description will refer to the following drawings, in which like numbers refer to like items, and in which.

DETAILED DESCRIPTION OF PREFERRED EMBODIMENTS

Figure 1:
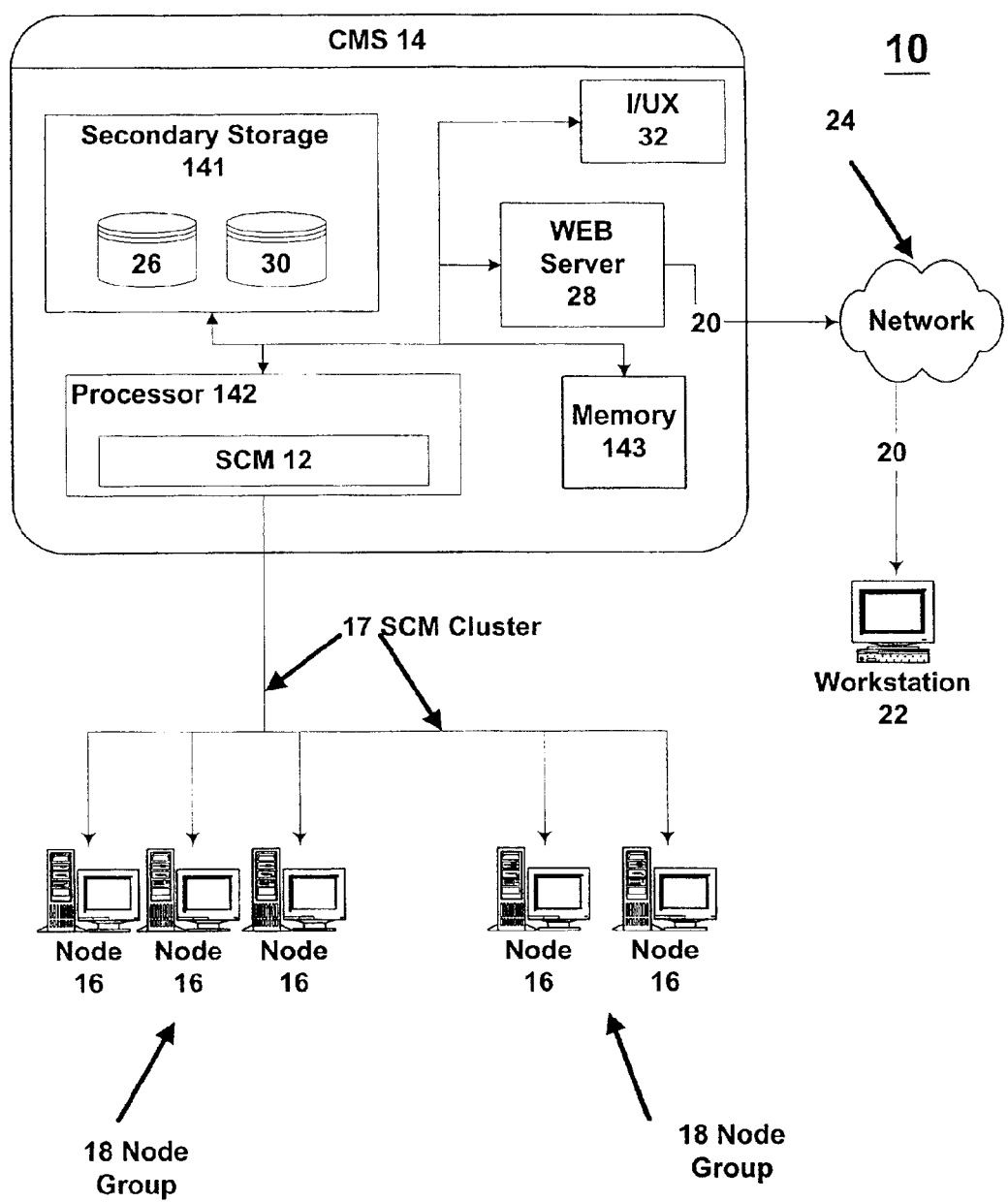
FIG. 1 is a block diagram of a network system in which an embodiment may be used.

An embodiment may be used with network computer systems in which it is necessary to secure the system and in which only a restricted class of users (e.g., root users) have complete read and write access to the system. FIG. 1 illustrates such a computer system 10. The computer system 10 comprises a ServiceControl Manager ("SCM") 12 running on a Central Management Server ("CMS") 14 and one or more nodes 16 managed by the SCM 12 on the CMS 14. Together the one or more nodes 16 managed by the SCM 12 make up a SCM cluster 17. A group of nodes 16 may be organized as a node group 18.

The CMS 14 preferably is an HP-UX 11.x server running the SCM 12 software. The CMS 14 includes a memory 143, a secondary storage device 141, a processor 142, an input device (not shown), a display device (not shown), and an output device (not shown). The memory 143, a computer readable medium, may include RAM or similar types of memory, and the memory 143 may store one or more applications for execution by processor 142, including the SCM 12 software. The secondary storage device 141, a computer readable medium, may include a hard disk drive, floppy disk drive, CD-ROM drive, or other types of non-volatile data storage. The processor 142 executes the SCM 12 software and other application(s), which are stored in memory 143 or secondary storage 141, or received from the Internet or other network 24, in order to provide the functions and perform the methods described in this specification, and the processing may be implemented in software, such as software modules, for execution by the CMS 14 and nodes 16. The SCM 12 is programmed in Java® and operates in a Java environment. See ServiceControl Manager Technical Reference, HP® part number: B8339-90019, available from Hewlett-Packard Company, Palo Alto, Calif., which is hereby incorporated by reference, for a more detailed description of the SCM 12. The ServiceControl Manager Technical Reference, HP® part number: B8339-90019 is also accessible at http://www.software.hp.com/products/scmgr.

Generally, the SCM 12 supports managing a single SCM cluster 18 from a single CMS 14. All tasks performed on the SCM cluster 18 are initiated on the CMS 14 either directly or remotely, for example, by reaching the CMS 14 via a web connection 20. Therefore, a workstation 22 at which a user sits only needs the web connection 20 over a network 24 to the CMS 14 (or a managed node 16) in order to perform tasks on the SCM cluster 18. The user may access the CMS 14 and the SCM cluster 18 from a workstation through command line interfaces ("CLIs") or graphical user interfaces ("GUIs") (not shown). In addition to the SCM 12 software and the HP-UX server described above, the CMS 14 preferably also comprises a data repository 26 for the SCM cluster 17, a web server 28 that allows web access to the SCM 12 and a depot 30 comprising products used in the configuring of nodes, and a I/UX server 32.

The nodes 16 are preferably HP-UX servers or other servers and they may be referred to as "managed nodes" or simply as "nodes". Conceptually, a node 16 represents a single instance of HP-UX running on a hardware device. The node 16 may comprise (not shown) a memory, a secondary storage device, a processor, an input device, a display device, and an output device. The SCM 12 is designed to manage single node HP-UX systems such as the N Class as well as the separate protection domains in a SuperDome™.

The CMS 14 itself is preferably also a managed node 16, so that multi-system aware ("MSA") tools can be invoked on the CMS 14. All other nodes 16 are preferably explicitly added to a SCM cluster 18. Generally, user access to SCM 12 files is delineated to root users, who have permission to read, write, and execute files and non-root users, who have limited access to files (e.g., only execute).

Although the CMS 14 is depicted with various components, one skilled in the art will appreciate that this server can contain additional or different components. In addition, although aspects of an implementation are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the CMS 14 to perform a particular method, such as those described herein.

The SCM 12 is preferably an object-oriented programming application. Object-oriented programming is a method of programming that pairs programming tasks and data into re-usable chunks known as objects. Each object comprises attributes (i.e., data) that define and describe the object. Java classes are meta-definitions that define the structure of a Java object. Java classes when instantiated create instances of the Java classes and are then considered Java objects. Methods within Java objects are called to get or set attributes of the Java object and to change the state of the Java object. Associated with each method is code that is executed when the method is invoked.

Some objects and classes discussed herein are named with a prefix "mx". The mx prefix is indicative of the application utilizing the objects and classes (e.g., the SCM 12), and is merely exemplary. The names of classes, objects, methods and functions discussed herein are exemplary, are not intended to be limiting, and are merely used for ease of discussion. The terms function and method are used interchangeably herein.

Generally, user access to SCM 12 files is delineated to root users, who have permission to read, write, and execute files and non-root users, who may have limited access to files (e.g., only execute).

Figure 2:
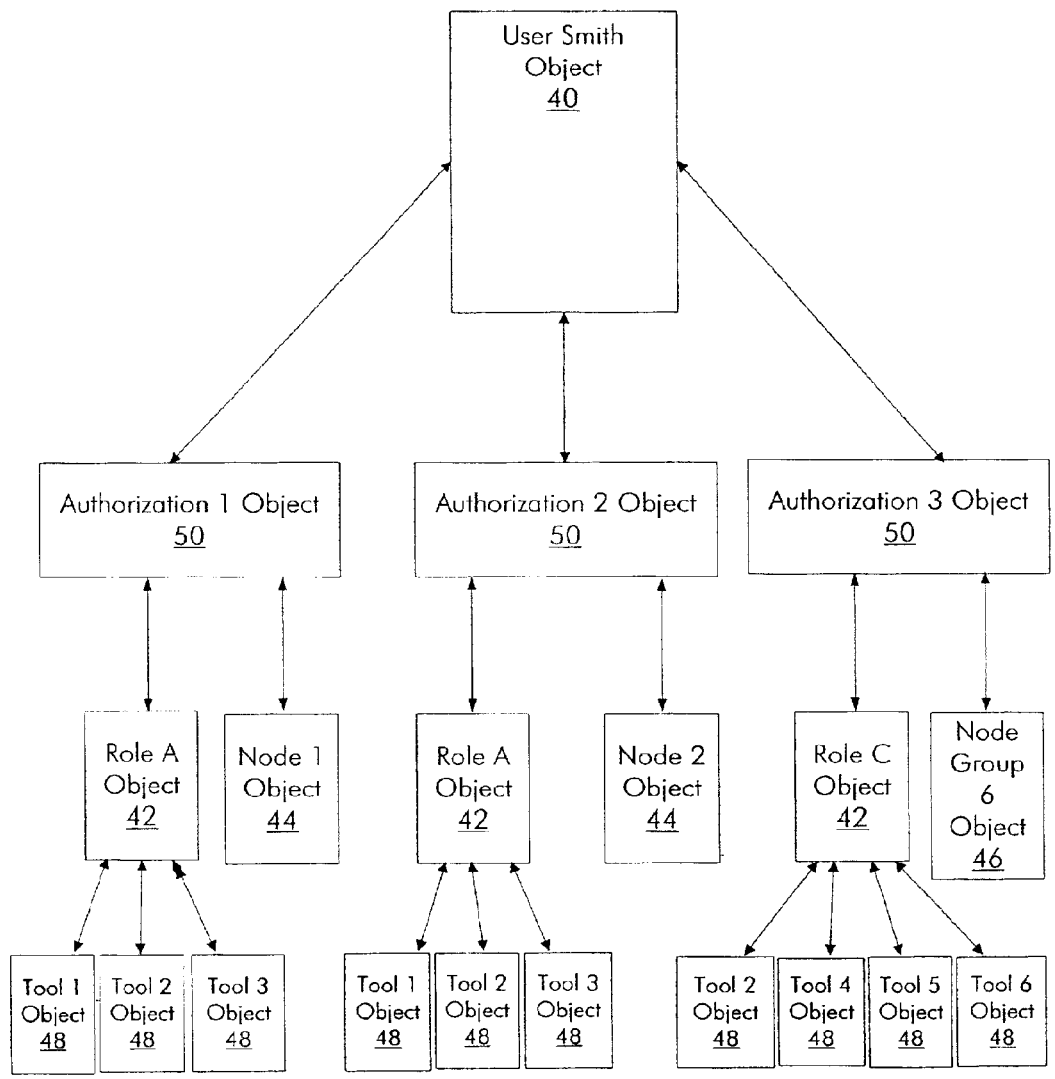
FIG. 2 is a block diagram conceptually illustrating components of an embodiment.

In an embodiment, conceptually illustrated in FIG. 2, root users allocate permissions to read, write, and execute files to non-root users. Roles comprise certain delineated tasks (e.g., delete a file, write to a file, add a user to the operating system and, modify a database entry) that non-root users are authorized to perform on authorized machines (e.g., nodes 16) for a specific purpose. A tool is an executable that performs a process. The tools define the delineated tasks of the roles and comprise coding necessary to perform the tasks. The tools are created for each of the tasks and are then assigned to a role or roles in order to fulfill the purposes of the role or roles. Once a role is created with assigned tools, the role may be authorized for a user to use on one or more machines. An authorization defines the node(s) and node group(s) that the user is authorized to access and what roles the user has on the authorized node(s) or node group(s). Through this authorization, the tools are allocated to users based on authorized roles.

An example of a newly created role may be a "database administrator" role. A database administrator may need to be able to perform tasks such as adding database entries, deleting database entries, modifying database entries, compiling database entries, and searching database entries. Accordingly, tools that perform these tasks would be created and assigned to the new database administrator role. Certain tools may be useful in a plurality of roles, and therefore, would be assigned to the plurality of roles. Likewise, when a new role is created, existing tools that define and perform the necessary tasks may be assigned to the new role.

Roles are authorized for use in order to allocate tools to the user. The tools to which a role is assigned may give the users root access to a system for a narrow, limited purpose on certain machines (e.g., nodes 16). Note that some tools may not provide root access. Continuing with the previous example, the newly created database administrator role may be authorized for a user "Smith" to use on a node 16 named "NODE1". Consequently, the user Smith has the role database administrator on NODE1 and may execute the tools delegated to the user Smith based on the database administrator role on NODE1. In this example, the user Smith does not have the database administrator role on any other node 16, and therefore, cannot execute the tools of the database administrator role on any other node 16 (such as a node 16 named "NODE2"). Likewise, the user Smith only has the database administrator role on NODE1, and therefore, cannot execute any tools, other than those of the database administrator role, on NODE1.

As illustrated in FIG. 2, users may be authorized to use a role on more than one machine. Likewise, users may be authorized for more than one role. FIG. 2 depicts a user object 40, which represents a user and includes attributes that describe the user. The user object 40, and other objects described herein, may be Java objects that are instantiated Java classes running in a Java Virtual Machine on the system 10 described above. When the SCM 12 is running, the user object 40 and the other objects may be resident in the memory of the CMS 14.

FIG. 2 further illustrates role objects 42, which represent roles for which the user is authorized, node objects 44, which represent the nodes 16 on which the user may utilize the roles, and node groups 46 which represent the node groups 18 on which the user may utilize the roles. Each role object 42 may be assigned to one or more tools (a tool may also be considered to be assigned to a role). Therefore, FIG. 2 also shows tool objects 48 which represent the tools assigned to the various roles and which are delegated to the user represented by the user object 40 based on the authorized roles.

Each role object 42 may comprise an enablement attribute that allows the role represented by each role object 42 to be disabled (and enabled) by setting the enablement attribute to false (and true). When a role is disabled, execution of the tools allocated to the role is disabled only for that role. If any of the tools allocated to the disabled role are also allocated to another enabled role(s), then those tools still may be executed, but only for the enabled role(s). A tool may be disabled in a similar manner (e.g., by setting a tool object 48 enablement attribute to false). However, disabling a tool as such will prevent execution of the tool for all roles to which the tool is allocated.

A user's authorization to utilize various roles and their tools on certain nodes 16 or node groups 18 may be maintained by authorization objects 50. Accordingly, FIG. 2 also illustrates authorization objects 50 which define the roles and nodes 16 and/or node groups 18 for which the user is authorized. In an embodiment, authorization objects 50 for each role and node or node group for which a user is authorized may be created. Since these authorization objects 50 link a user to a role and a node 16 or node group 18, the authorization objects 50 may be referred to as authorization "triplets".

The objects shown in FIG. 2 may be accessed and managed by software components referred to as object managers (not shown). In the computer system 10, the object managers may be components of the SCM 12 that run on the CMS 14. For example, the authorization objects 50, the tool objects 48, the node group objects 46, node objects 44, role objects 42 and user objects may be accessed and managed by a security manager, a tool manager, node group manager, node manager, role manager and user manager, respectively. In the computer system 10, a method of the role manager may be invoked to get (e.g., retrieve and instantiate) a role object 42, for example, in order to get or set an attribute of the role object 42. If an attribute of the role object 42 is set (e.g., modified), the role object 42 may be returned to the role manager in order to persist the modification (e.g., store the modified role object). Object manager methods are preferably invoked via remote method invocations ("RMIs").

Figure 3A:
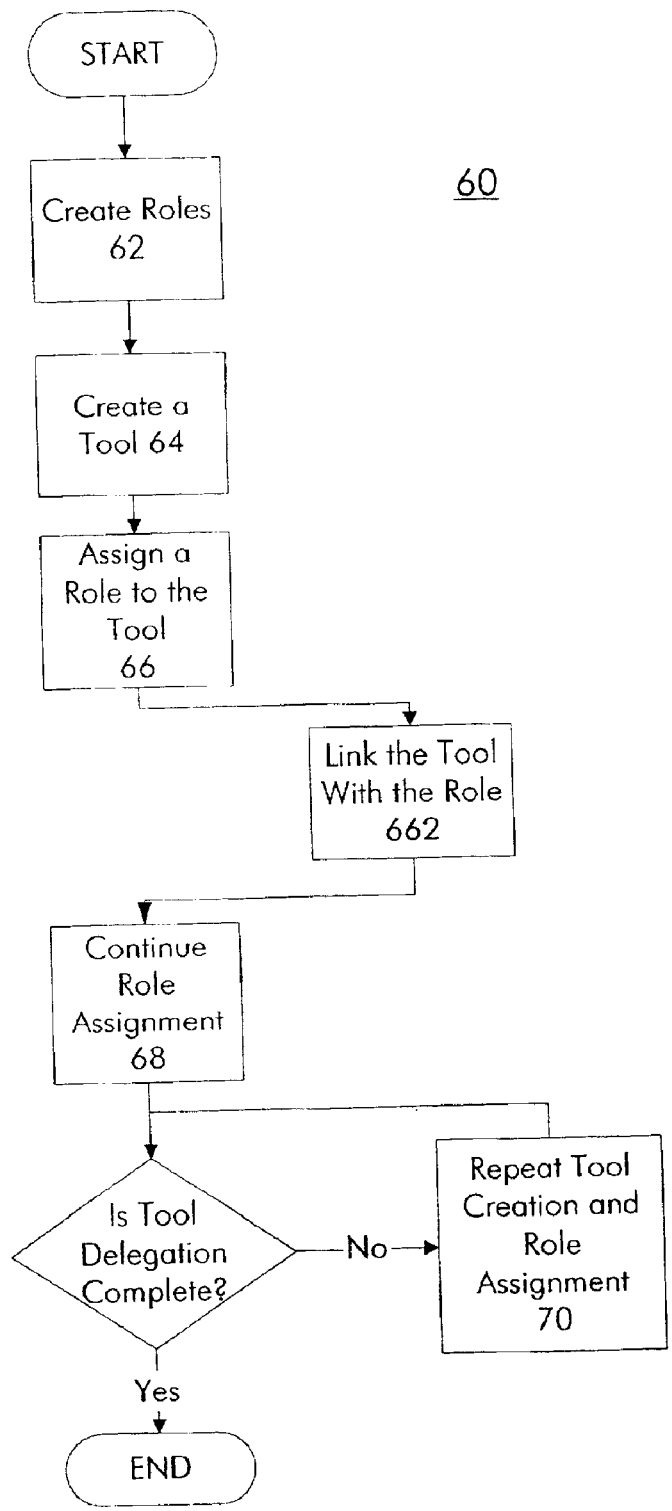
FIGS. 3a and 3b are flowcharts illustrating a method for role-based tool delegation.
Figure 3B:
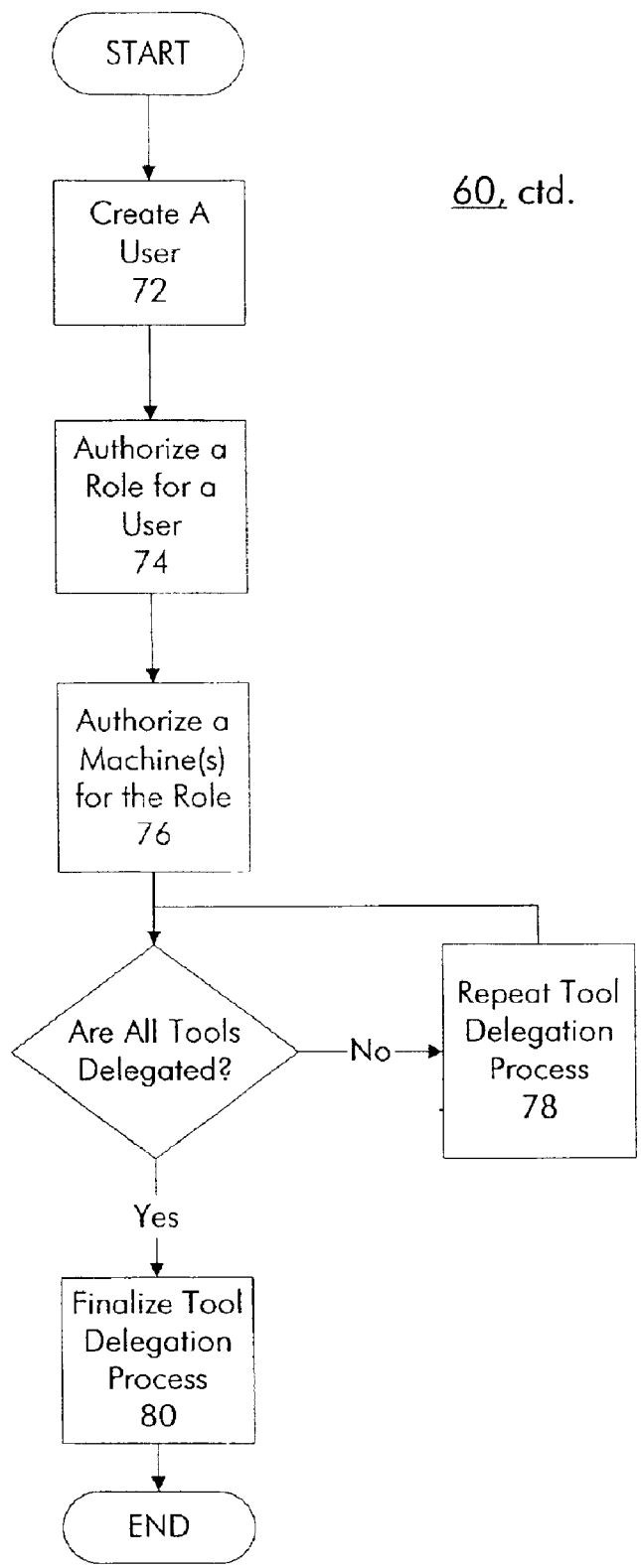

FIGS. 3a and 3b are flowcharts illustrating a method 60 for role-based tool delegation according to the present invention. FIG. 3a illustrates a part of the method 60 comprising the creation of roles and assigning of roles to tools. As shown in FIG. 3a, the method 60 may comprise creating roles 62, creating a tool 64, assigning a role to the tool 66, continuing role assignment 68 and repeating tool creation and role assignment until tool delegation is complete 70. Creating roles 62 preferably comprises determining what roles are needed and what tasks a user with each role may perform, and defining the roles. What roles are needed may be determined by the computer system on which the roles are created and the jobs that a root user decides delegate to non-root users to perform. For example, if the computer system (e.g., the computer system 10 shown in FIG. 1) included databases on a plurality of machines (e.g., nodes 16), one such job that a root user may decide to delegate to non-root users is database administrator. Delegating database administrator jobs, and other lower-level, time-intensive jobs, to non-root users allows the root user to concentrate on more important things (e.g., maintaining system security) and the computer system to be more efficiently run.

Requirements for fulfilling the jobs for which the roles are created help determine the tasks that a user with each role may perform. For example, a database administrator may need to add entries, modify entries, delete entries, search entries, compile data from the entries, etc. Defining the roles may comprise describing the job each role is intended to fulfill and the tasks that may be performed by a user with each role. In an embodiment (e.g., as a role of the SCM 12), the role may be created as a role object 42 that includes code and attributes that define the role. The tasks that a user with each role may perform determine which tools are allocated to which roles.

Creating a tool 64 preferably comprises determining a task to be performed by the tool and writing code that defines the task and the parameters of the tool and that is executed when the tool is invoked to perform the task. For example, the task may be copying a file. In order to copy a file, the file, the location of the file and the target location for the copy of the file must be identified. Accordingly, code to perform a file copying operation and that defines the tool parameters as the file, the location of the file and the target location for the copy of the file is written to create the tool. In an embodiment (e.g., as a tool of the SCM 12), the tool may be created as a tool object 48 that includes the code and attributes that define the operation performed by the tool and the tool parameters.

Assigning a role to the tool 66 preferably comprises determining that the tool fulfills one of the created role's tasks and linking 662 the tool with the role. Generally, a role is assigned to the tool when the role is created. Indeed, a tool may be created to fulfill a task determined to be necessary for a specific role. However, the order of these steps is not critical, other than that a role cannot be assigned to a tool until both the tool and role have been created.

Linking 662 the tool with the role may comprise writing code that links the tool with the role so that a user authorized to utilize the role will be able to execute the tool. As noted above, in an embodiment, the tool and the roles may be objects. Linking 662 the tool with the role may comprise populating an attribute of the tool object 58 with data that identifies the role. Populating attributes of the tool object 48 may be accomplished by invoking mutator methods (e.g., set methods) of the tool object 48. This linking 662 enables the computer system (e.g., computer system 10) to confirm that a user authorized to utilize the role may execute the tool or tools assigned to the role.

Continuing role assignment 68 reflects the fact that a tool may be assigned a plurality of roles (or, the tool may be considered to be assigned or allocated to a number of roles). Tools may perform tasks that are necessary for a plurality of roles. For example, two (or more) roles may require that a user authorized to utilize the roles be able to add new users. Accordingly, a tool that enables the adding of new users is allocated to both of these roles. Continuing role assignment 68 therefore may comprise repeating step 66 until no more roles need to be assigned to the tool.

Repeating tool creation and role assignment 70 until tool delegation is complete may comprise creating additional tools and assigning role(s) to the additional tools until a tool is linked to each role for each task of each role. Accordingly, repeating tool creation and role assignment 70 until tool delegation is complete preferably comprises repeating steps 64 through 68 until this condition is met, as shown in FIG. 3a.

From the above, it may appear that multiple roles are created, a single tool is created at a time, the tool is assigned one or more roles and the process is repeated until all of the roles are linked with the necessary tools. Indeed, these steps represent an exemplary process of creating tools and roles and assigning tools to roles. In another embodiment, the process may be implemented by, for example, creating a plurality of tools with a single role created at a time, the tools allocated to the role until the role is linked with all the necessary tools, and the process repeated for any additional roles necessary. Tools may be created well in advance of the creation of a new role, so that the role is created with old, pre-existing tools. Moreover, a new tool may be created when a role is created when a role creator determines that a new tool is needed to perform a task of the role. In other words, the process described above (with references to FIG. 3a) is a dynamic process that is not restricted by temporal limitations.

Once a role has been created and tools allocated to the role, a user may be authorized to utilize the role on one or more machines (e.g., a node 16 or node group 18). Through this role-based authorization, tools are delegated to users. Accordingly, FIG. 3b illustrates the continuation of the method 60 for role-based tool delegation according to the present invention. As shown, the method 60 comprises creating a user 72, authorizing a role for a user 74, authorizing a machine or machines for the authorized role 76, repeating tool delegation process 78 and finalizing tool delegation process 80. The steps illustrated in FIG. 3b may be performed at any time after the steps shown in FIG. 3a.

Creating a user 72 may comprise adding a new user to the SCM 12 on which the roles and tools are created. Adding a new user may comprise entering information that identifies the user. Indeed, the delegation process described below may be considered as part of creating a user 72. As noted above, in a preferred embodiment, the user may be created as a user object 40 (e.g., as a user of the SCM 12) that includes attributes that define and describe the user. The user object 40 may include attributes that identify the roles and nodes that for which the user is authorized.

Authorizing a role for a user 74 may comprise determining that a user will have a certain role (e.g., a trusted user, database administrator) on the computer system (e.g., computer system 10) and linking the role with the user so that the user can utilize the role and run the role's tools. When a user is created, the root user, or a user with a role (e.g., trusted user or supervisor) that enables the adding of users and authorizations of roles, may be adding the user for a specific purpose, such as administering a database on a certain machine or administering a Web-site hosted by a certain machine. As such, the root user, trusted user and/or supervisor may determine that the new user will have a database administrator or Web-site administrator role.

Alternatively, the root user, trusted user and/or supervisor may determine what tools the new user will need to be delegated in order to fulfill a certain purpose or accomplish certain tasks. These tools may determine what role the user will be authorized. If the tools are not found within an existing role, a new role may be created, according to the process described above with reference to FIG. 3a. Once it has been determined that a user will have a certain role, that role is preferably linked to the user so that the user is authorized to execute the role's tools.

In a preferred embodiment, a user's authorization for a role is created as an authorization object 50 (e.g., as an authorization object of the SCM 12) that is linked to the user object 40 and that indicates that a user is authorized to utilize the role and tools to which the role is assigned, thereby allocating the assigned tools to the user. In this embodiment, authorizing a role for the user 74 preferably comprises creating an authorization object 50 that comprises a plurality of attributes, and populating one of the attributes with data identifying the role (e.g., data identifying a role object 42, such as a role object 42 name). Mutator methods (e.g., set methods) of the authorization object 50 may be invoked in order to populate the attributes of the authorization object 50.

In a preferred embodiment, a user is authorized to utilize a role on a specific machine or machines. Accordingly, authorizing a machine or machines for the authorized role 76 comprises determining on which machine or machines (e.g., node 16, nodes 16, and/or node groups 18) the user will utilize the role and linking the user's role authorization to the determined machine or machines. In a preferred embodiment, a user's authorization for utilizing a role on a machine or machines (e.g., on a node 16, nodes 16 or node group 18) is created as an authorization object 50 (e.g., as an authorization object of the SCM 12) that is linked to the user object 40 and that indicates that a user is authorized to utilize a role and the role's assigned tools on the machine. In such an embodiment, authorizing a machine for the authorized role 76 may comprise populating one of the attributes of the authorization object with data identifying the authorized machine (e.g., data identifying a node object 44, such as a node object 44 name).

Additional tools may be delegated to the user beyond those delegated by the authorized role. Accordingly, repeating the tool delegation process 78 may comprise repeating authorizing a role 74 and authorizing a machine or machines for the authorized role 76. Repeating the tool delegation process 78 may continue until all the tools determined to be delegated to the user are delegated to the user, and therefore, until all the necessary roles and nodes are authorized for the user.

Finalizing the tool delegation process 80 may comprise saving the authorizations created as described above. For example, in a preferred embodiment in which the authorizations are created as authorization objects 50, finalizing the tool delegation process 80 comprises saving the authorization objects 50. In the computer system 10, the authorization objects 50 may be stored in the repository 26 on the CMS 14, from which they may be accessed by an authorization manager component of the SCM 12.

A root user, or a user with the role enabling privilege for the modification of authorization objects 50, may access the authorization objects 50 via the security manager and modify the attributes of the authorization objects 50 in order to add nodes 16 or node groups 18 on which users are authorized to utilize the role. Likewise, the user objects 40, role objects 42, and tool objects 48 may be stored in the repository 26 and accessed via user manager, role manager and tool manager components of the SCM 12 by a root user or a user with a sufficient SCM privileges to modify roles, tools or to create new authorizations for users.

Some users are transient in nature. These transient users may only need to occasionally use tools that provide limited root-access. For example, a trouble-shooter, such as a customer engineer, may need to access certain tools to provide certain requested technical support or service. The customer engineer may need to service one node 16 or node group 18 and then move to a different node 16 or node group 18 to service that node 16 or node group 18. The customer engineer may have no support or service requests one day, and then have multiple support or service requests the next day.

Accordingly, certain roles are created, and allocated appropriate tools, for use by transient users. For example, a customer engineer role may be created and allocated tools that provide, e.g., diagnostic and repair functions. These tools provide the necessary root access to perform these certain delineated tasks. A customer engineer may be authorized to utilize the customer engineer role on the machines (e.g., nodes 16 or node groups 18) for which the customer engineer is responsible. However, a system administrator may not want the customer engineer to be able to execute the tools allocated to the customer engineer role at all times. Therefore, the system administrator or others with root access should be able to easily disable (and enable) execution of these tools.

Figure 4A:
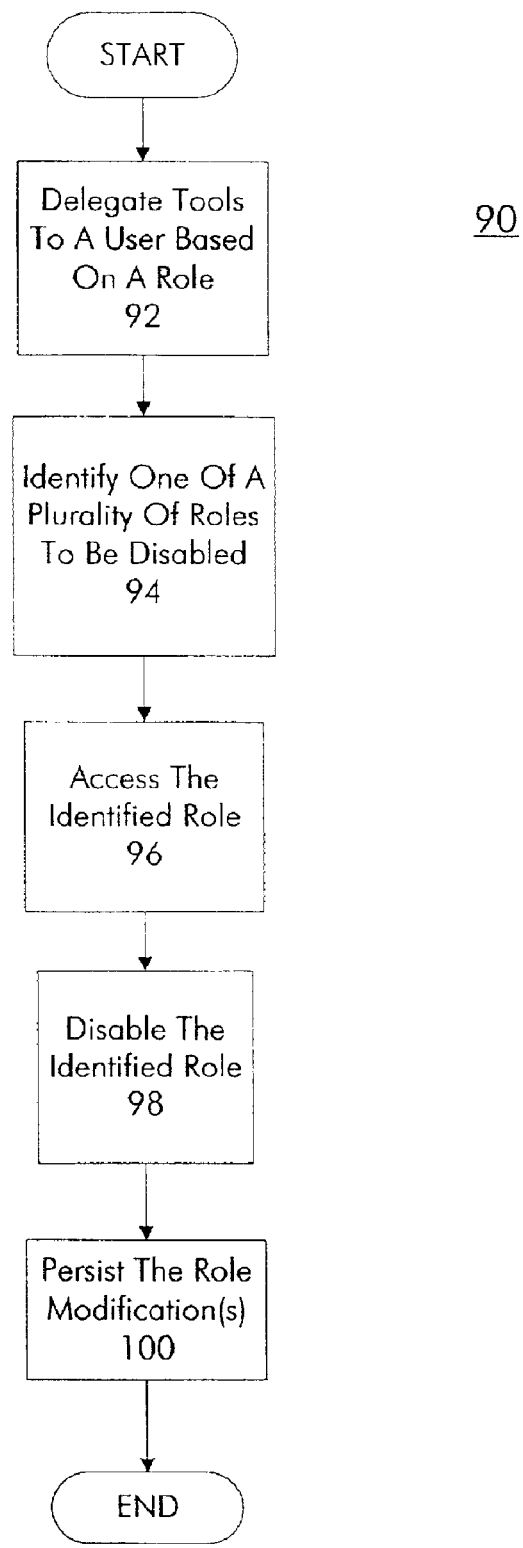
FIGS. 4a and 4b are flowcharts illustrating a method for disabling and enabling tool execution via roles according to an embodiment.

FIG. 4*a* illustrates a method 90 for managing tool execution via roles; in this illustration, disabling tool execution via roles in a computer system, wherein the computer system comprises a plurality of roles. As shown, the method 90 comprises delegating tools to a user based on a role 92, identifying one of the plurality of roles to be disabled 94, accessing the identified role 96, disabling the role 98, and persisting the role modification(s) 100. Delegating tools to a user based on an authorized role 92 preferably comprises executing a method such as the method 60 for role-based tool delegation shown in FIGS. 3*a*–3*b*. The role authorized for the user by executing method 60 may be a transient role (e.g., a customer engineer role) that delegates tools for performing various client service and support tasks, for example. When the role is first authorized for the user, the role is preferably enabled. Step 92 may be performed at a completely separate time than the remaining steps 94–98 (e.g., well in advance of steps 94–98).

Identifying one of the plurality of roles to be disabled 94 preferably comprises an administrator (or other root-user) determining that the role authorized for the user according to step 92 is to be disabled. Usually the role to be disabled is a transient role, such as a customer engineer role. However, other non-transient roles may be disabled according to the method 90. In a preferred embodiment of the invention, identifying a role to be disabled 94 may comprise an administrator of the computer system 10 entering a command, through a CLI or GUI, that identifies a role object 42 representing the role to be disabled and that invokes a role manager method, through a RMI. The command may identify the role object 42 by passing the role object name to the role manager.

Accessing the identified role 96 preferably comprises the administrator (or other root-user) accessing the authorized role identified in step 94 so that status of the authorized role may be changed (e.g., disabled). In a preferred embodiment of the invention, accessing the role 96 may comprise the role object 42 identified in step 94 being returned to process space of the CLI or GUI that the administrator is using (e.g., to enter the command in step 94). In response to the RMI invoked by the CLI or GUI command, the role manager may return the identified role object.

Disabling the identified role 98 preferably comprises the administrator (or other trusted user) disabling the authorized role, which was accessed in step 96, so that any user (including the present user) assigned the identified role cannot run the delegated tools. In a preferred embodiment of the invention, the role object 42 comprises an enablement attribute. The enablement attribute is preferably a Boolean attribute that may be set to true or false. When the enablement attribute is set to true, the role is enabled, the user may utilize the role and execute the tools allocated to the role. When the enablement attribute is set to false, the role is disabled and the tools allocated to the role may not be executed (execution of the tools is disabled).

Accordingly, in a preferred embodiment, disabling the role 98 comprises setting the enablement attribute of the role object 42 to false. Setting the enablement attribute of the role object 42 to false may comprise the CLI or GUI invoking a mutator method (e.g., setEnablement( )) of the returned role object 42 and passing the Boolean value false with the mutator method invocation. Once the enablement attribute of the role object 42 is set, the role object 42 is preferably returned to the role manager. Persisting the role modification(s) 100 may comprise the role manager persisting (storing) the role object 42 in the data repository 26, thereby storing the role object 42 attributes.

Figure 4B:
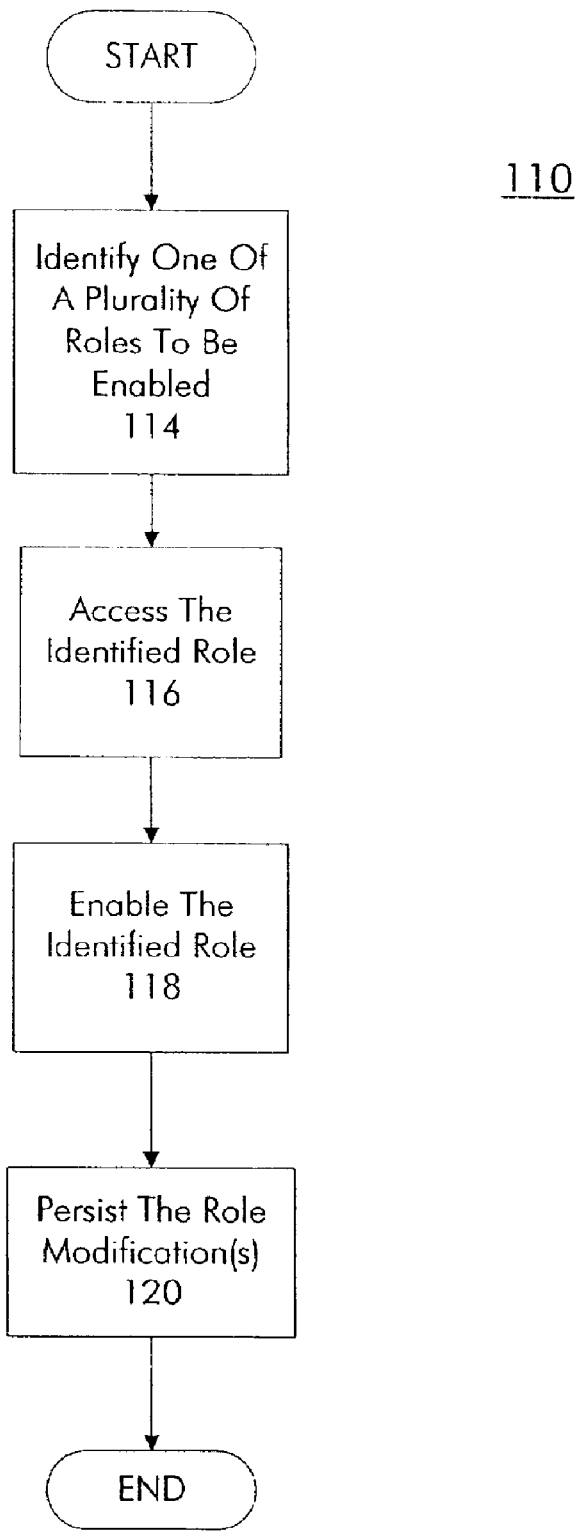

FIG. 4*b* illustrates a method 110 of managing tool execution via roles; in this illustration, enabling tool execution via roles. The method 110 preferably comprises identifying one of a plurality of roles to be enabled 114, accessing the identified role 116, enabling the identified role 118 and persisting the role modification(s) 120. The steps 114–120 may be performed similarly to the steps 94–100 of the method 90. For example, identifying one of a plurality of roles to be enabled 114 preferably comprises an administrator (or other trusted user) determining which of a plurality of roles on a system is to be enabled. The role to be enabled may be the authorized role disabled according to the method 90. Usually the role to be enabled is a transient role, such as a customer engineer role.

For example, if a customer engineer is requested to perform customer service or support, the administrator may determine to enable the customer engineer role. Other non-transient roles may be enabled according to the method 110. In a preferred embodiment, identifying a role to be enabled 114 may comprise an administrator of the computer system 10 entering a command, through a CLI or GUI, that identifies a role object 42 representing the role to be enabled and that invokes a role manager method, through a RMI. The command may identify the role object 42 by passing the role object name to the role manager.

Accessing the identified role 116 preferably comprises the administrator (or other trusted user) accessing the authorized role identified in step 114 so that role may be enabled. In a preferred embodiment, accessing the identified role 116 may comprise the role object 42 identified in step 114 being returned to process space of the CLI or GUI that the administrator is using (e.g., to enter the command in step 114). In response to the RMI invoked by the CLI or GUI command, the role manager may return the identified role object.

Enabling the identified role 118 preferably comprises the administrator (or other root user) enabling the authorized role, which was accessed in step 116, so that the user can run the delegated tools. As noted above, in a preferred embodiment, the role object 42 comprises an enablement attribute. When the enablement attribute is set to true, the role is enabled, the user may utilize the role and execute the tools allocated to the role (execution of the tools is enabled). Accordingly, in a preferred embodiment, enabling the role 118 comprises setting the enablement attribute of the role object 42 to true. Setting the enablement attribute of the role object 42 to true may comprise the CLI or GUI invoking a mutator method (e.g., setEnablement( )) of the returned role object 42 and passing the Boolean value true with the mutator method invocation. Persisting the role modification(s) 120 may be performed as described above with regard to persisting the role modification(s) 100 in FIG. 4*a*.

Figure 5:
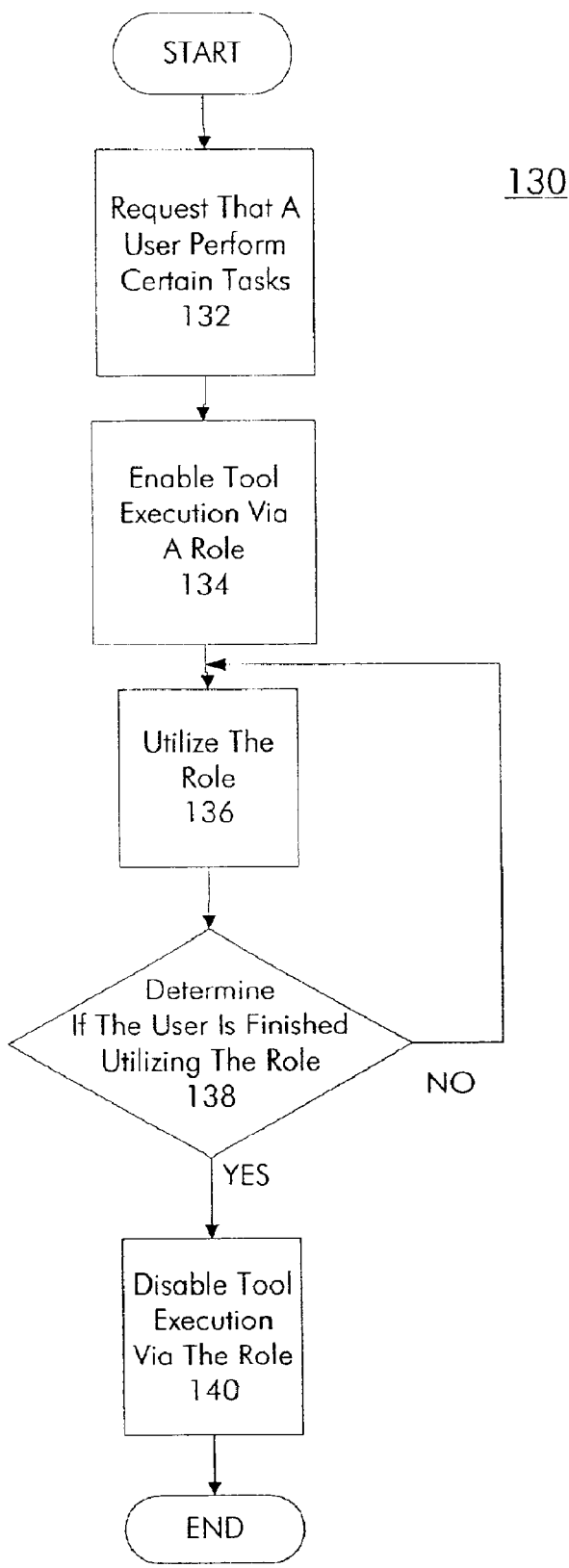
FIG. 5 is a flowchart illustrating an example of enabling and disabling of tool execution via a role.

FIG. 5 illustrates an exemplary sequence 130 of enabling/disabling tool execution via roles. The exemplary sequence 130 demonstrates the application of the methods 90 and 110 illustrated in FIGS. 4*a* and 4*b*. The exemplary sequence 130 comprises requesting that a user perform certain tasks 132, enabling tool execution via a role 134, a user utilizing the role 136, determining if the user is finished utilizing the role 138 and disabling tool execution via the role 140. Requesting that a user perform certain tasks 132 may comprise, for example, a service request being submitted for a customer engineer. Certain tools of a transient role may accomplish the certain tasks. As such, enabling tool execution via a role 134 may comprise enabling the transient role according to the method 110.

A user utilizing the role 136 may comprise the customer engineer executing the certain tools of the transient role to fulfill the certain tasks. Determining if the user is finished utilizing the role 138 may comprise an administrator (or other root user) determining if the customer engineer has completed the certain tasks. Alternatively, the administrator may set a limited time to permit utilizing the role. Once the customer engineer has completed the certain tasks or the time has expired, the administrator may want to disable the transient role so as to eliminate the root access. Accordingly, disabling tool execution via the role 140 preferably comprises the execution of steps 94–100 of the method 90 to disable the transient role. If a user attempts to utilize a disabled role, a warning that the user is not authorized to access the role is preferably displayed. Alternatively, the warning may state that the role has been disabled.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and their equivalents.

What is claimed is:

1. A method of managing tool execution via roles on a computer system while maintaining computer system security, wherein the computer system comprises a plurality of roles, comprising:

delegating one or more tools to a user based on a first role, wherein a tool provides root access and the first role enables the user to run the delegated tool(s);

identifying one of the plurality of roles to be disabled, wherein the role identified to be disabled is the first role;

accessing the role identified to be disabled so that the status of the role identified to be disabled may be changed; and, disabling the role identified to be disabled, whereby the status of the role identified to be disabled is changed, so that the user cannot run the delegated tool(s).

2. The method of claim 1, wherein the first role is represented by a role object comprising an enablement attribute that has a value that determines whether the first role is enabled or disabled, wherein disabling the role identified to be disabled comprises:

setting the enablement attribute value so that the first role is disabled.

3. The method of claim 2, wherein the user is represented by a user object, wherein delegating one or more tools to a user based on a role comprises linking the role object to the user object with an authorization object.

4. The method of claim 2, wherein identifying one of the plurality of roles to be disabled comprises a root user entering, through a command line interface ("CLI") or graphic user interface ("GUI"), a command that identifies the role object.

5. The method of claim 4, wherein the CLI or GUI operate in a process space and wherein accessing the role identified to be disabled comprises returning the role object to the CLI or GUI process space.

6. The method of claim 1, wherein delegating one or more tools to a user based on a role comprises:
   a) authorizing the first role for the user, the first role comprising the delegated tool(s); and
   b) authorizing a machine of the computer system for the first role, wherein the computer system comprises a plurality of machines and the user is enabled to utilize the first role only on authorized machines, whereby utilizing the first role comprises running the one or more tools of the first role.

7. The method of claim 1, further comprising:
   identifying one of the plurality of roles to be enabled, wherein the role identified to be enabled is the first role;
   accessing the role identified to be enabled; and
   enabling the role identified to be enabled, whereby the status of the role identified to be enabled is changed, so that the user can run the delegated tool(s).

8. A computer readable medium comprising instructions for managing tool execution via roles on a computer system while maintaining computer system security, wherein the computer system comprises a plurality of roles, by:
   delegating one or more tools to a user based on a first role, wherein a tool provides root access and the first role enables the user to run the delegated tool(s);
   identifying one of the plurality of roles to be disabled, wherein the role identified to be disabled is the first role;
   accessing the role identified to be disabled so that the status of the role identified to be disabled may be changed; and,
   disabling the role identified to be disabled, whereby the status of the role identified to be disabled is changed, so that the user cannot run the delegated tool(s).

9. The computer readable medium of claim 8, wherein the authorized role is represented by a role object comprising an enablement attribute that has a value that determines whether the first role is enabled or disabled, wherein disabling the role identified to be disabled comprises:
   setting the enablement attribute value so that first role is disabled.

10. The computer readable medium of claim 9, wherein the user is represented by a user object, wherein delegating one or more tools to a user based on a role comprises linking the role object to the user object with an authorization object.

11. The computer readable medium of claim 9, wherein identifying one of the plurality of roles to be disabled comprises a root user entering, through a CLI or GUI, a command that identifies the role object.

12. The computer readable medium of claim 11, wherein the CLI or GUI operate in a process space and wherein accessing the role identified to be disabled comprises returning the role object to the CLI or GUI process space.

13. The computer readable medium of claim 8, wherein delegating one or more tools to a user based on a role comprises:
   a) authorizing the first role for the user, the authorized role comprising the delegated tool(s); and
   b) authorizing a machine of the computer system for the first role, wherein the computer system comprises a plurality of machines and the user is enabled to utilize the first role only on authorized machines, whereby utilizing the first role comprises running the one or more tools of the first role.

14. The computer readable medium of claim 8, further comprising instructions for managing tool execution via roles on the computer system, by:
   identifying one of the plurality of roles to be enabled, wherein the role identified to be enabled is the first role;
   accessing the role identified to be enabled; and
   enabling the role identified to be enabled, whereby the status of the role identified to be enabled is changed, so that the user can run the delegated tool(s).

15. A method of managing tool execution via roles on a computer system while maintaining computer system security, wherein the computer system comprises a plurality of roles, comprising:
   identifying one of the plurality of roles to be enabled, wherein the role identified to be enabled is a first role of a user, wherein the first role enables the user to run one or more delegated tools, wherein a tool provides root access for performing a specific task in the computer system;
   accessing the role identified to be enabled so that the status of the role identified to be enabled may be changed; and,
   enabling the role identified to be enabled, whereby the status of the role identified to be enabled is changed, so that the user can run the delegated tool(s).

16. The method of claim 15, further comprising:
   identifying one of the plurality of roles to be disabled, wherein the role identified to be disabled is the first role;
   accessing the role identified to be disabled; and
   disabling the role identified to be disabled, whereby the status of the role identified to be disabled is changed, so that the user cannot run the delegated tool(s).

17. The method of claim 16, wherein the user runs at least one of the delegated tool(s) after the enabling step is performed, wherein identifying one of the plurality of roles to be disabled comprises a root user determining that the user is finished running the delegated tool(s).

18. The method of claim 15, wherein the user is a customer engineer, wherein identifying one of the plurality of roles to be enabled comprises a root user determining that the customer engineer needs to run at least one of the delegated tool(s).

19. The method of claim 15, wherein the first role is represented by a role object comprising an enablement attribute that has a value that determines whether the first role is enabled or disabled, wherein enabling the role identified to be enabled comprises:
   setting the enablement attribute value so that the first role is enabled.

20. The method of claim 19, wherein the enablement attribute value is a Boolean value and setting the enablement attribute value comprises setting the enablement attribute value to true.

* * * * *